Patented Feb. 5, 1946

2,394,375

UNITED STATES PATENT OFFICE 2,394,375

ADHESIVE COMPOSITION AND METHOD OF MAKING SAME

Malcolm E. Gross, Akron, Ohio, assignor to The B. F. Goodrich Company, New York, N. Y., a corporation of New York No Drawing. Application August 3, 1943, Serial No. 497,217

15 Claims. (Cl. 260—3)

This invention relates to adhesive compositions and to a method of preparing the same, and particularly to the manufacture of an adhesive for use in adhering rubbery materials to each other and to other substances, such as metals.

Heretofore, various compositions designed for use in the adhesion of natural and synthetic rubbers to each other and to metals have been proposed, but most of these prior compositions suffer from disadvantages which tend to prevent their universal adoption. Various phenolic resins have been recommended for use as rubber to metal adhesives, and have been found somewhat satisfactory for some applications, where final adhesion is effected by vulcanization, and heat and pressure are provided during the vulcanization process. However, such resins can generally not be used where the vulcanization is accomplished at low temperatures, and are unsuitable for numerous other adhesive processes. Other well-known adhesives, such as natural and synthetic rubber cements, are ineffective in adhering rubbery materials to metal, and suffer from other disadvantages.

It is, therefore, an object of this invention to produce an adhesive which can be widely used for many adhesive problems involving natural and synthetic rubber, metals, and other bases. Another object is to provide an adhesive which is easy to apply, is stable when stored for extended periods of time, is sensitive to heat over a wide temperature range, and which provides when used a tough, flexible film, which shows little decrease in adhesion on aging. A further object of the invention is to provide an inexpensive and readily performed method for preparing the adhesive. Other objects relative to specific adhesion problems will hereinafter appear.

These, and other objectives are accomplished by the novel adhesive provided by this invention. Since the properties and nature of the adhesive depend largely upon its method of preparation, the adhesive will be described with reference to the method used for preparing it.

Broadly speaking, the preparation of the adhesive involves, first reacting a phenol, specifically resorcinol, and furfural, to form a fusible, soluble, partially-condensed resinous product, dissolving the resinous product in a volatile organic solvent therefor, then further condensing the partially-condensed resin in the presence of an acidic condensation catalyst, to a point short of that at which the resin becomes infusible, and finally, adding to the resin solution thus obtained a solution of a rubbery material dissolved in a volatile organic solvent. The addition of the rubber solution prevents the resin from condensing to its final infusible stage, in which event the resin solution would set to an irreversible gel, and instead produces a stable fluid adhesive composition.

The first step in the preparation of the adhesive, namely, the preparation of the fusible, partially-condensed, phenol furfural resinous product, is preferably carried out by heating substantially equal proportions of a phenol and furfural to a temperature of about 80 to 110° C. until the reaction mixture has reached a pre-determined degree of viscosity. The desired degree of viscosity is that which represents the formation of a fusible, soluble, phenol furfural condensation product, and will obviously depend upon the particular phenol being used. When resorcinol is the phenol employed, it has been found that the desired degree of condensation is reached when the viscosity of the reaction mixture as measured on a No. 1 Zahn viscosimeter is from 30 to 40 seconds at the temperature of the reaction mixture. This point is ordinarily reached when the reaction has continued from one to six hours at 85 to 110° C. When the desired degree of condensation has been attained, as shown by viscosity, the reaction mixture is cooled and is dissolved in a volatile organic solvent. The nature and proportion of the solvent may be varied widely and is not critical, but in general best results are obtained if the solvent employed is a solvent for the rubbery material subsequently used in preparing the adhesive and if the proportion of the resin in the solvent is from about 30 to 70% by weight of the solution. The solution of the partially-condensed resin thus obtained is stable and may be stored indefinitely until needed for use in the second step of the preparation of the adhesive.

If desired, other methods of preparing a solution of a fusible, partially-condensed, phenol furfural resin may also be employed. Thus, instead of reacting substantially equal proportions of the phenol and furfural in the absence of added material, an excess of one of the reagents may be used, or alkaline condensation catalysts may be present during the condensation. Similarly, other temperatures and times of reaction may be employed, provided a fusible, partially-condensed resin is the product. It is most convenient however to react the phenol and furfural in the absence of other materials in the manner hereinabove described.

The second step in the preparation of the adhesive involves the further condensation in the presence of an acidic condensation catalyst of the partially-condensed resin present in the resinous solution prepared as described above to a point short of that at which the reaction yields an infusible resin. This step is carried out by adding an acidic condensation catalyst such as an amine hydrochloride, a mineral acid or a metal chloride, preferably an amine hydrochloride such as hydroxylamine hydrochloride, in a proportion of 1% or less, preferably from 0.1 to 0.5%, based on the weight of the resin to the solution and allowing further condensation to occur. This step should be carried out at a temperature less than about 40° C., and, since the reaction is exothermic, cooling is ordinarily required. Since this step in the reaction, if allowed to continue uninterrupted would result in complete condensation of the phenol and furfural to an infusible resin, together with gelling of the solution, it is essential that this step also be carried out only until a predetermined viscosity of the solution is obtained. Here again the desired viscosity is somewhat less than that of a solution in which the infusible stage has been reached and gelling has started. When resorcinol is the phenol employed and the concentration of resin in the solution is about 50%, the desired viscosity is from 10 to 15 seconds when tested with a No. 3 Zahn viscosimeter at 25° C. This stage of the reaction ordinarily requires from one to six hours at temperatures below 40° C.

When the resin solution prepared in the second step of the preparation has obtained the desired degree of viscosity, the third and final step in the preparation is immediately carried out. This step consists in addition to the resin solution prepared in the preceding step, of a solution of a rubbery material in a volatile solvent. The rubbery material may be either natural rubber or any of the various synthetic rubbers such as the elastic, vulcanizable rubbery polymers and copolymers of open-chain aliphatic conjugated dienes, the polyalkylene polysulfide synthetic rubbers known as "Thiokol" or any other elastic vulcanizable rubbery material. Such rubbery materials may be either compounded with the various pigments, fillers, softeners, vulcanizing agents, accelerators of vulcanization and the like, or uncompounded; and the solvent employed may be any sufficiently unreactive volatile organic solvent which dissolves the particular rubbery material used. However, it is preferred that the solvent used for the rubbery material be one which is not a solvent for the phenol furfural resin with which the rubbery material is mixed, but the solvents used for these two ingredients of the cement should be miscible one with another, and be approximately equal in volatility. The proportion in which the rubber solution is added to the resinous solution may be varied widely, depending upon the properties desired in the adhesive, and is not critical, but in general, the amount of the rubber should be from ½ to 2 times that of the resin. After addition of the rubber solution to the resin solution, the finished adhesive is obtained. Obviously, if desired, the finished adhesive may be diluted with either a solvent for the rubber or a solvent for the resin or both to any desired concentration.

The addition of the solution of the rubbery material serves to stabilize the solution of the resin and prevent, or at least substantially retard, the further condensation of the resin to its final infusible stage. The stability of the final adhesive solution may further be increased by adding to the solution, or by including in the rubbery compound added to the resin solution, a material which is a condensation and polymerization inhibitor, examples of such substances including aliphatic mercaptans and phenylhydrazine. The stability of the adhesive is also increased by employing as small amount of the acidic condensation catalyst in the second stage as possible; thus the use of less than 0.5% of the catalyst yields a more stable adhesive than when 1% of catalyst is used. Another procedure for insuring the formation of the most stable adhesive is to carry out the stages of the preparation in glass-lined vessels rather than in vessels made of metals.

In a preferred embodiment of the invention, 65 parts by weight of resorcinol and 65 parts by weight of furfural are placed in a glass-lined reaction vessel. The mixture is stirred and heated in the temperature range, 85 to 110° C., where it is maintained throughout the reaction. After heating for about four hours, the viscosity of the reaction mixture as tested with a No. 1 Zahn viscosimeter, has reached 36 seconds, whereupon the reaction is terminated. The fusible resin obtained is then cooled to below 80° C. and is dissolved in 144 parts by weight of methyl ethyl ketone. The resinous solution thereby obtained is then mixed with 1.13 parts of hydroxylamine hydrochloride, dissolved in a small quantity of dilute alcohol, and further condensation of the resin is allowed to take place at a temperature around 30° C. This condensation in the presence of the hydroxylamine hydrochloride is then continued until the reaction mixture possesses a viscosity as determined on a No. 3 Zahn viscosimeter of 12 seconds, at which time a synthetic rubber cement consisting of about 300 parts of an ethylene dichloride solution containing 50 parts of a synthetic rubber prepared by copolymerizing butadiene-1,3 and a lesser amount of acrylonitrile, is added thereto. The product is a fluid, stable adhesive, which may be stored for an extended period of time before use. Since the adhesive contains a butadiene acrylonitrile synthetic rubber, it is particularly useful in adhesions where an oil-resistant, heat-resistant bond is desired.

Although the invention has been described above, with relation to a particular adhesive prepared from resorcinol and furfural and incorporating a butadiene acrylonitrile synthetic rubber, the invention is by no means limited thereto. Thus, instead of resorcinol, various other phenols, including phenol itself, the various cresols, xylenol, naphthol, pyrogallol phloroglucinol, hydroquinone and the like, may also be employed. However, polyhydric phenols, and especially resorcinol, are preferred.

Moreover, various other synthetic rubbers, in addition to the butadiene-1,3 acrylonitrile synthetic rubber may also be used. For instance, synthetic rubbers prepared by the polymerization of conjugated dienes containing aliphatic open chains such as butadiene-1,3, 2,3-dimethyl butadiene-1,3, piperylene, isoprene, methyl pentadiene, chloroprene and the like, either alone or in admixture with each other or with one or more other copolymerizable compounds, especially with lesser amounts of copolymerizable compounds containing a single olefinic double bond, may also be employed. Examples of such copolymerizable compounds include, in addition to acrylonitrile, acrylic and substituted acrylic esters such as methyl acrylate and methyl methacrylate, styrene and its polymerizable substituted derivatives, vinyl ketones, vinylidene chloride, isobutylene and the like. Furthermore, natural rubber including hevea rubber, guayule and like gums may be employed as the rubbery material in the preparation of the adhesive.

The solvents mentioned in the preferred embodiment may also be substituted by various other solvents. Thus, the solvent used in preparing the resin solution may be, in addition to methyl ethyl ketone, other ketones such as cyclohexanone, or esters such as butyl acetate, butyl propionate, cyclohexyl acetate, or the like, or any other solvent which dissolves the synthetic resin, and which preferably is also a solvent for the rubbery material used in the adhesive. Similarly, the ethylene dichloride used in the specific example, which is a good solvent for the butadiene-1,3 acrylonitrile synthetic rubber, may be substituted by various other solvents for this synthetic rubber, such as chlorobenzene or nitromethane, or by still other solvents when other rubbery materials are used.

The adhesives of this invention may be subjected to a variety of uses. For example, the adhesive prepared in the specific example may be used for adhering natural or synthetic rubber to metal, to plastics, concrete, wood, or to various other rigid bases. In such adhesions, the base member is first cleaned in the usual manner, and the adhesive is then brushed or spread on the clean surface. The rubber material to be adhered to the base member is then applied and the composite structure vulcanized. These adhesives may be used when the vulcanization of the rubbery material to be adhered to the metal is conducted at ordinary vulcanization temperatures or at room temperature, as for example, when an air-curing rubber cement is applied to the metal after applying the adhesive. Moreover, the adhesives may be used in adhering natural and synthetic rubbers to themselves or to each other, and the rubber so adhered may be either in the vulcanized or unvulcanized stage. Even metals may be tightly adhered to themselves by the use of the adhesives of this invention.

While I have herein disclosed with considerable particularity certain preferred manners of performing the invention, I do not thereby desire or intend to limit myself solely thereto, for, as hitherto stated, the procedure may be modified, the precise proportion of the materials utilized may be varied, and other materials having equivalent properties may be employed if desired without departing from the spirit and scope of the invention as defined in the appended claims.

I claim:
1. The method of making an adhesive composition which comprises condensing a phenol and furfural to form a fusible, soluble, partially-condensed resinous product, dissolving the said resinous product in a volatile organic solvent therefor, further condensing the said resinous product in the presence of an acidic condensation catalyst to a point short of that at which the resin becomes infusible, and finally adding to the resin solution thus obtained a solution of an elastic vulcanizable rubbery material selected from the class consisting of natural rubber and synthetic rubbers prepared by the polymerization of an open chain aliphatic conjugated diene, whereupon a stable adhesive composition is obtained.

2. The method of making an adhesive composition which comprises heating a mixture consisting of substantially equal parts by weight of a phenol and furfural to form a fusible, soluble, partially-condensed resinous product, dissolving the said resinous product in a volatile organic solvent therefor, adding an acidic condensation catalyst to the solution and further condensing the said resinous product to a point short of that at which the resin becomes infusible, and finally adding to the resinous solution thus obtained a solution of an elastic vulcanizable rubbery material selected from the class consisting of natural rubber and synthetic rubbers prepared by the polymerization of an open chain aliphatic conjugated diene, whereby a stable adhesive composition is obtained.

3. The method of claim 2 wherein the phenol is resorcinol.

4. The method of making an adhesive composition which comprises heating a mixture consisting of substantially equal parts of resorcinol and furfural to a temperature of 85 to 110° C. to form a fusible, soluble, partially-condensed resinous product, dissolving the said resinous product in a volatile organic solvent therefor, adding an acidic condensation catalyst to the solution, and further condensing the said resinous product to a point short of that at which the resin becomes infusible, and finally adding to the resin solution thus obtained a solution of an elastic vulcanizable rubbery material selected from the class consisting of natural rubber and synthetic rubbers prepared by the polymerization of an open chain aliphatic conjugated diene, whereby a stable adhesive composition is obtained.

5. The method of claim 4, wherein the acidic condensation catalyst is hydroxylamine hydrochloride.

6. The method of making an adhesive composition which comprises heating a mixture of resorcinol and furfural to a temperature of 85 to 110° C. to form a fusible, soluble, partially-condensed resinous product, dissolving the said resinous product in a volatile organic solvent therefor, which solvent is also capable of dissolving butadiene acrylonitrile synthetic rubber, adding an acidic condensation catalyst to the solution, and further condensing the said resinous product to a point short of that at which the resin becomes infusible, and finally adding to the resin solution thus obtained a solution of a butadiene acrylonitrile synthetic rubber, dissolved in a solvent therefor, which solvent is not capable of dissolving phenol furfural resins, whereby a stable adhesive composition is obtained.

7. The method of claim 6, wherein the partially condensed resinous product is dissolved in methyl ethyl ketone and the synthetic rubber is dissolved in ethylene dichloride.

8. An adhesive composition prepared by the method of claim 1.

9. An adhesive composition prepared by the method of claim 2.

10. An adhesive composition prepared by the method of claim 4.

11. An adhesive composition prepared by the method of claim 14.

12. An adhesive composition prepared by the method of claim 15.

13. An adhesive composition prepared by the method of claim 6.

14. The method of making an adhesive composition which comprises heating a mixture consisting of substantially equal parts of resorcinol and furfural to a temperature of 85 to 110° C. to form a fusible, soluble, partially-condensed resinous product, dissolving the said resinous product in a volatile organic solvent therefor, adding an acidic condensation catalyst to the solution, further condensing the said resinous product to a point short of that at which the resin becomes infusible, and finally adding to the resin solution thus obtained a solution of a synthetic rubber prepared by the polymerization of an open chain aliphatic conjugated diene, whereby a stable adhesive composition is obtained.

15. The method of making an adhesive composition which comprises heating a mixture consisting of substantially equal parts of resorcinol and furfural to a temperature of 85 to 110° C. to form a fusible, soluble, partially-condensed resinous product, dissolving the said resinous product in a volatile organic solvent therefor, adding an acidic condensation catalyst to the solution, further condensing the said resinous product to a point short of that at which the resin becomes infusible, and finally adding to the resin solution thus obtained a solution of a synthetic rubber prepared by copolymerizing butadiene-1,3 and acrylonitrile, whereby a stable adhesive composition is obtained.

MALCOLM E. GROSS.